United States Patent
Russ

(10) Patent No.: US 9,211,958 B2
(45) Date of Patent: Dec. 15, 2015

(54) RAM AIR TURBINE BIASING ASSEMBLY

(75) Inventor: David Everett Russ, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 829 days.

(21) Appl. No.: 13/430,965

(22) Filed: Mar. 27, 2012

(65) Prior Publication Data

US 2013/0259683 A1 Oct. 3, 2013

(51) Int. Cl.
*F01D 1/20* (2006.01)
*B64D 41/00* (2006.01)

(52) U.S. Cl.
CPC ................ *B64D 41/007* (2013.01)

(58) Field of Classification Search
CPC .................................. B64D 41/007
USPC ........................................ 416/142
See application file for complete search history.

(56) References Cited

U.S. PATENT DOCUMENTS

| | | | |
|---|---|---|---|
| 2,248,405 A | 7/1941 | Freeman | |
| 3,360,239 A | 12/1967 | Swearingen | |
| 4,742,976 A | 5/1988 | Cohen | |
| 4,743,163 A * | 5/1988 | Markunas et al. | 416/44 |
| 4,991,796 A | 2/1991 | Peters et al. | |
| 5,122,036 A | 6/1992 | Dickes et al. | |
| 5,145,324 A | 9/1992 | Dickes et al. | |
| 5,487,645 A | 1/1996 | Eccles | |
| 5,562,417 A | 10/1996 | Grimm et al. | |
| 5,564,903 A * | 10/1996 | Eccles et al. | 416/174 |
| 5,746,580 A * | 5/1998 | Parker et al. | 416/245 R |
| 6,331,099 B1 | 12/2001 | Eccles et al. | |
| 6,580,179 B2 | 6/2003 | Eccles et al. | |
| 6,676,379 B2 | 1/2004 | Eccles et al. | |
| 7,077,631 B2 | 7/2006 | Eccles et al. | |
| 7,086,760 B2 | 8/2006 | Chuang | |
| 8,066,481 B2 | 11/2011 | Bannon | |
| 2003/0189382 A1* | 10/2003 | Tornquist et al. | 310/90 |
| 2007/0160460 A1 | 7/2007 | Eccles et al. | |
| 2007/0237640 A1* | 10/2007 | Russ | 416/142 |
| 2009/0091201 A1* | 4/2009 | Scherzinger et al. | 310/86 |
| 2009/0214148 A1* | 8/2009 | Lemmers | 384/517 |
| 2011/0229309 A1 | 9/2011 | Russ | |
| 2012/0128495 A1 | 5/2012 | Bortoli et al. | |

FOREIGN PATENT DOCUMENTS

CN 102198860 9/2011

* cited by examiner

*Primary Examiner* — Igor Kershteyn
*Assistant Examiner* — Woody A Lee, Jr.
(74) *Attorney, Agent, or Firm* — Carlson, Gaskey & Olds, P.C.

(57) ABSTRACT

An example ram air turbine biasing assembly includes a support member that holds a biasing member. The biasing member biases a component of a ram air turbine. The support member includes a step that limits movement of the component toward the biasing member.

10 Claims, 4 Drawing Sheets

RAM AIR TURBINE BIASING ASSEMBLY

BACKGROUND

This disclosure relates to ram air turbines utilized to provide emergency power for an aircraft. More particularly, this disclosure relates to biasing assemblies within a ram air turbine that supplies both electric and hydraulic power to an aircraft.

A ram air turbine is used to generate supplemental power in an aircraft by extracting power from an air stream along the exterior of the aircraft during flight. The ram air turbine includes a turbine that drives an electric motor or hydraulic pump. In operation, the turbine is moved from a stowed position within the aircraft to a position that provides clearance for blades of the turbine and the aircraft. The turbine is mounted at the end of a strut and drives a turbine drive shaft that in turn drives the electric motor or hydraulic pump.

The ram air turbine may experience extreme loads, such as during high level, short duration events (HLSDs). Biasing members of the ram air turbine can become damaged during such events. During an aircraft engine blade loss event, the severe HLSD vibrations occur first as the engine spools down. Then, as it continues to turn due to air loads, a high unbalance load continues to drive the longer duration windmilling vibrations. Either or both of these vibrations could significantly reduce the fatigue life of ram air turbine components without measures to limit impact loading.

SUMMARY

An example ram air turbine biasing assembly includes a support member that holds a biasing member. The biasing member biases a component of a ram air turbine. The support member includes a step that limits movement of the component toward the biasing member.

An example ram air turbine assembly includes a strut movable between a deployed position and a stowed position. The strut supports a turbine that is rotatable about a first axis. A drive shaft is rotatable about a second axis transverse to the first axis. The drive shaft drives a hydraulic pump and a generator. A gearbox rotatably couples rotation of the strut with the drive shaft. A gearbox bearing biasing member biases a gearbox bearing system away from the turbine. A gearbox bearing liner supports the gearbox bearing system. The gearbox bearing liner including a step that limits movement of the gearbox bearing system toward the gearbox bearing biasing member and minimizes HLSD impact loads. A similar stepped liner is used within the generator to limit motion of the generator rotor and minimize HLSD impact loads.

An example method of supporting a component in a ram air turbine assembly includes supporting the component using a support member, biasing the component using a biasing member, and limiting movement of the component toward the biasing member using a step of the support member.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
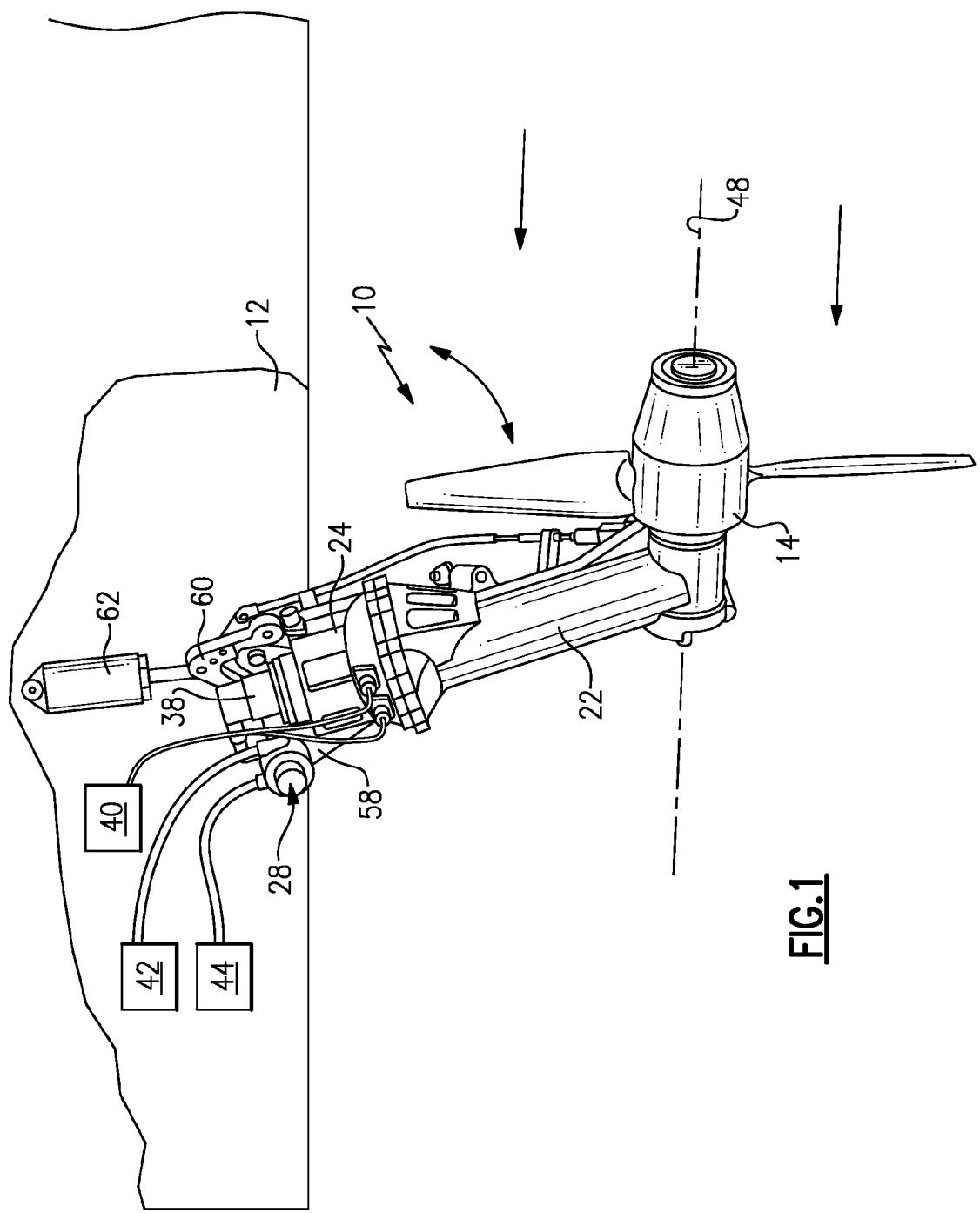
FIG. 1 is a schematic view of an example ram air turbine including a generator and a hydraulic pump.
Figure 2:
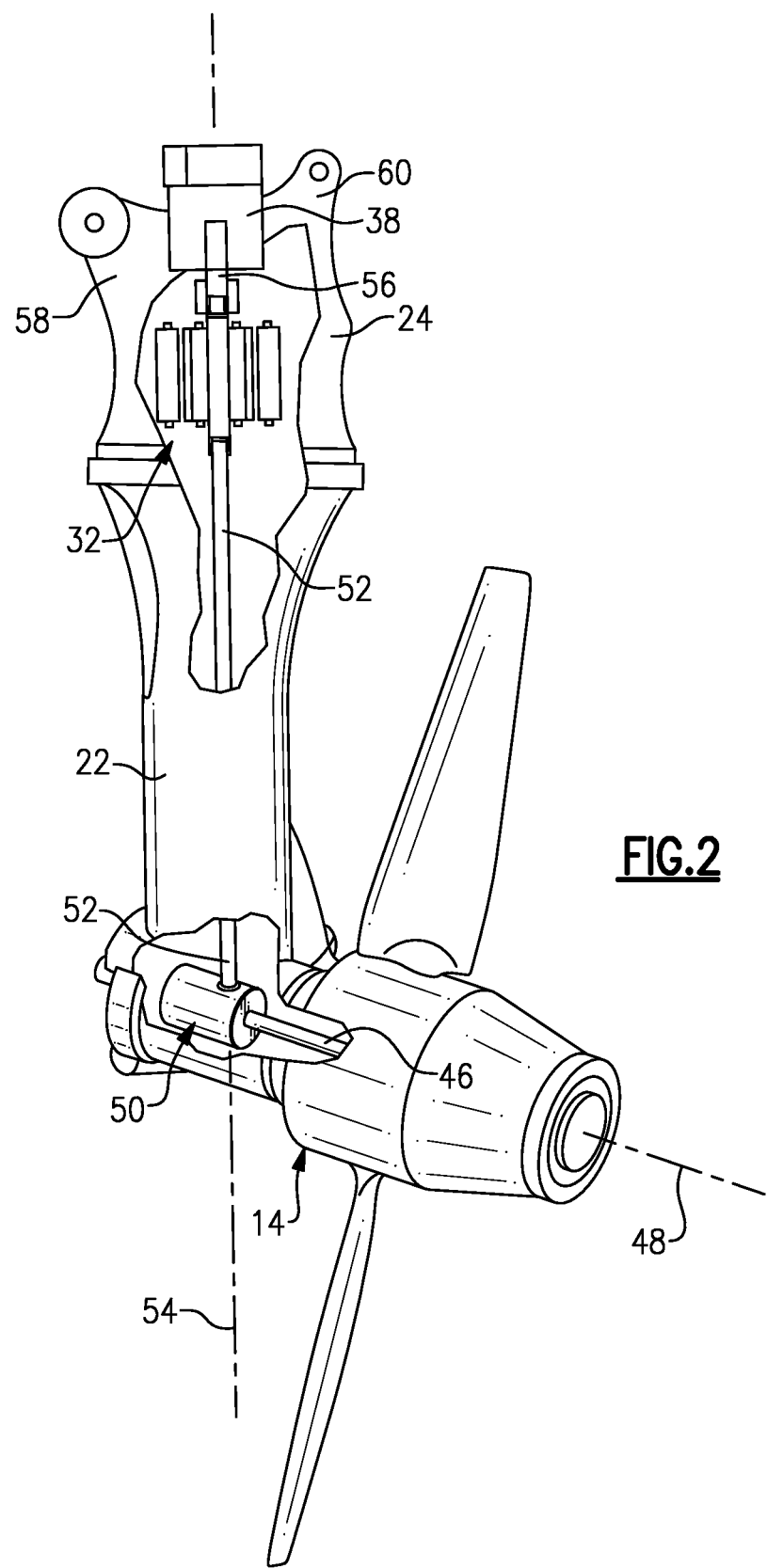
FIG. 2 is a sectional view of the example ram air turbine.

Referring to FIGS. 1 and 2, an example ram air turbine assembly (RAT) 10 is mounted to an airframe 12 and is deployable to provide both electric power and hydraulic power. The example RAT 10 includes a turbine 14 that rotates responsive to air flow along the outside of the airframe 12. The turbine 14 is supported at the end of strut 22 attached to a generator housing 24. The generator housing 24 is mounted for rotation to the airframe 12 with a swivel post 28.

A generator rotor 32 disposed within the generator housing 24 is coupled to a hydraulic pump 38. The generator 32 generates electric power that can be supplied to an aircraft system such as is schematically indicated at 40. The hydraulic pump 38 receives fluid from a fluid supply 44 and pumps the fluid to various systems indicated at 42 that utilize pressurized fluid for operation.

The turbine 14 rotates to drive a turbine shaft 46 about an axis 48. The turbine shaft 46 drives a gearbox 50. The example gearbox 50 is disposed aft of the turbine 14 and along the axis 48 of rotation of the turbine 14 and turbine shaft 46. The example gearbox 50 drives a drive shaft 52 that rotates about an axis 54 that is transverse to the axis 48. The drive shaft 52 extends from the gearbox 50 through the strut 22 to generator rotor 32. The drive shaft 52 is coupled to drive the generator 32 at a desired speed.

The example gearbox 50 includes gears that provide a desired ratio of rotational speed between the turbine shaft 46 and the drive shaft 52. In this example, the drive shaft 52 is rotated at a greater speed than the turbine shaft 46. The gearbox 50 can be configured to provide any desired speed ratio relative to rotation of the turbine 14.

The speed at which the drive shaft 52 is rotated is determined to provide the desired rotational speed required to drive the generator 32 and produce a desired amount of electrical energy at the desired frequency. The electrical energy produced by the generator 32 is then transmitted to the aircraft system schematically indicated at 40.

A second drive shaft 56 couples the hydraulic pump 38 in rotation with the generator 32 such that the hydraulic pump 38 rotates at the same speed as the generator 32. As the hydraulic pump 38 and the generator 32 are coupled to rotate together, the hydraulic pump 38 communicates pressurized fluid to the aircraft systems 40 at the same time as the generator 32 produces electric power.

The generator 32 is supported within the generator housing 24 at an end distal from the turbine 14. The generator housing 24 includes a mounting bracket 58 and an integral swivel bracket 60. The mounting bracket 58 attaches to an actuator 62. The actuator 62 drives movement of the RAT 10 between a stowed position within the airframe 12 and the deployed position schematically shown in FIG. 1.

The swivel bracket 60 mounts to the swivel post 28 to connect the actuator to RAT 10. The strut 22 is attached to the generator housing 24 and therefore moves with the pivoting movement of the generator housing 24. The hydraulic pump 20 is mounted to the generator housing 24 and therefore also rotates with the generator housing 24 during movement to the deployed position.

Figure 3:
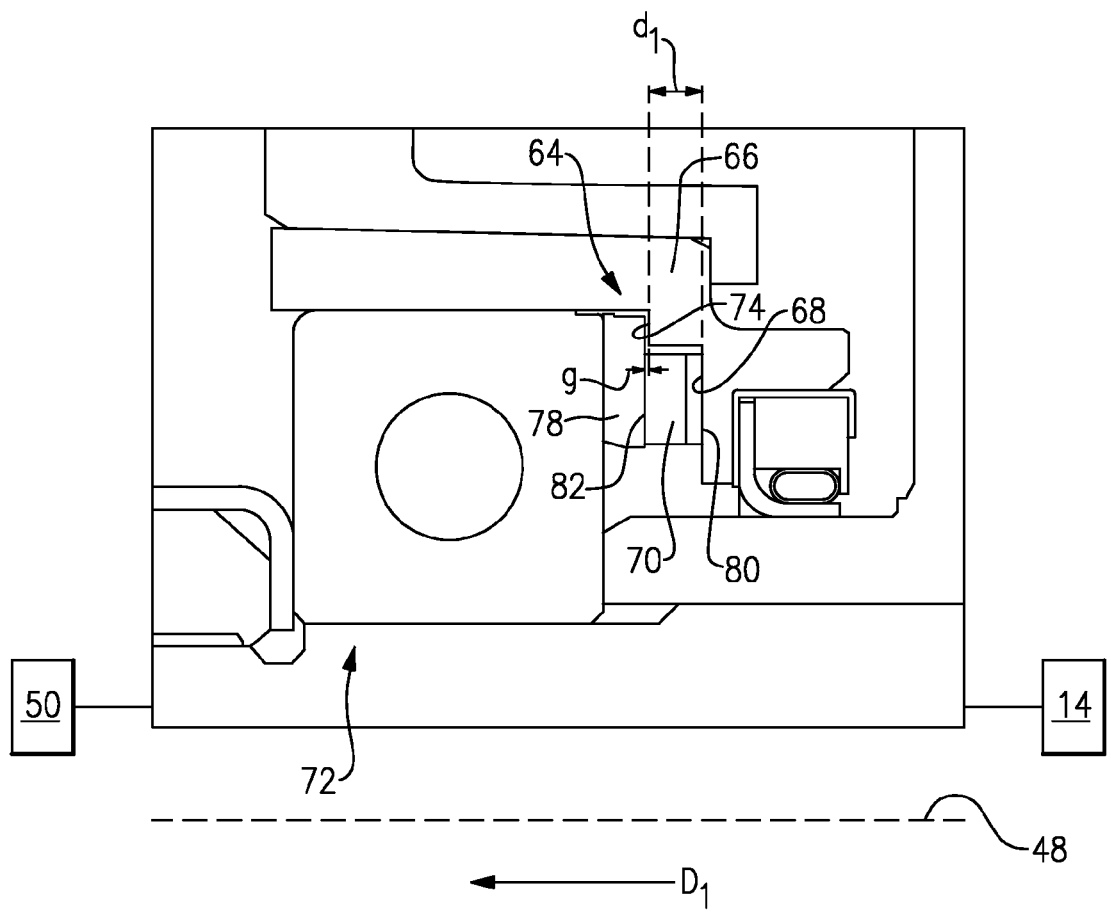
FIG. 3 shows a close-up sectional view of a gearbox bearing support liner within the FIG. 1 ram air turbine.
Figure 4:
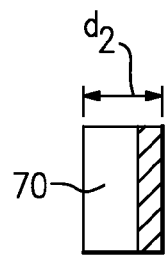
FIG. 4 shows a biasing member of the FIG. 1 ram air turbine in an uncompressed position.

Referring to FIG. 3, an example ram air turbine biasing assembly 64 includes a support member, such as a bearing liner 66, which provides a biasing member support surface 68. A biasing member 70 is supported by the biasing member support surface 68. In this example, the biasing member 70 is an annular wave spring that, during typical operation, biases a component of the RAT 10. In this example, the component is a gearbox bearing system 72 biased by the biasing member 70 axially away from the turbine 14 in a direction $D_1$. The gearbox bearing system 72 helps to rotatably support the gearbox 50. The biasing member 70 preloads the gearbox bearing system 72 in an axial direction to bias the turbine shaft through the gearbox forward bearing into the housing for support.

As will be explained in greater detail, the example bearing liner 66 includes a step 74 that limits movement of the gearbox bearing system 72 toward the biasing member 70. A shim stack 78 is used with the step 74 assist in limiting the movement of the gearbox bearing system 72 toward the biasing member 70.

A first side 80 of the biasing member 70 directly contacts the biasing member support surface 68, and an opposite, second side 82 of the biasing member 70 directly contacts the shim 78. When sufficient force is applied to the gearbox bearing system 72 in a direction opposite the direction $D_1$, the shim 78 also contacts the step 74. Contact between the shim 78 and the step 74 prevents the gearbox bearing system 72 from compressing the biasing member 70 past the step 74.

In some examples, the step 74 is located a distance $d_1$ from the bearing member support surface 68, and the biasing member 70 extends axially a distance $d_2$ when the biasing member 70 is not compressed. The first distance $d_1$ is from 86% to 98% of the second distance $d_2$ in such an example. Other examples may include other relationships. Biasing member 70 stress and cycling fatigue life may dictate certain relationships.

The gearbox bearing system 72 may move toward the biasing member 70 during a high level short duration event. Vibrations experienced during such events are especially damaging to components like the RAT 10 due to the RAT 10 having a relatively large cantilevered mass on the end of the strut 22, which amplifies the vibration amplitude. During a high level short duration event, the turbine 14 may be shaken vigorously back and forth along the axis 48, which causes the biasing member 70 to compress. The step 74 limits the amount of minimum to maximum stress variation on the biasing member 70.

Generally, the amount of compression on the biasing member 70 when the gearbox bearing system 72 moves toward the biasing member 70 is limited to a gap g between the step 74 and the shim stack 78. The same shim that protects the biasing member limits this gap to a small value, typically less than 0.015 inches (3.81 mm). The small gap limits the magnitude of the impact loading between the bearing and the bearing liner. This reduces the total housing fatigue stress during HLSD or windmilling after an engine blade failure. An additional benefit of shimming this gap is to keep the adjacent gear from impacting with its mating gear, which could cause damage.

Although FIG. 3 shows an axial side of the ram air turbine biasing assembly 64, the assembly extends circumferentially about the axis 48. In other examples, the biasing assembly 64 is not annular, or even circumferentially extending.

During assembly of the RAT 10, the distance $d_2$ of the biasing member 68 is shimmed at the same time that the gap g is shimmed because the step 74 controls the minimum distance $d_2$ of the biasing member 68. In some examples, the gap g is shimmed to be from about 0.003 inches (0.0762 mm) to about 0.014 inches (0.3556 mm). Such sizes of the gap g may help reduce impact loads on the gearbox bearing system 72 and on gears of the gearbox 50 as well as improve a useful life of the biasing member 70.

Figure 5:
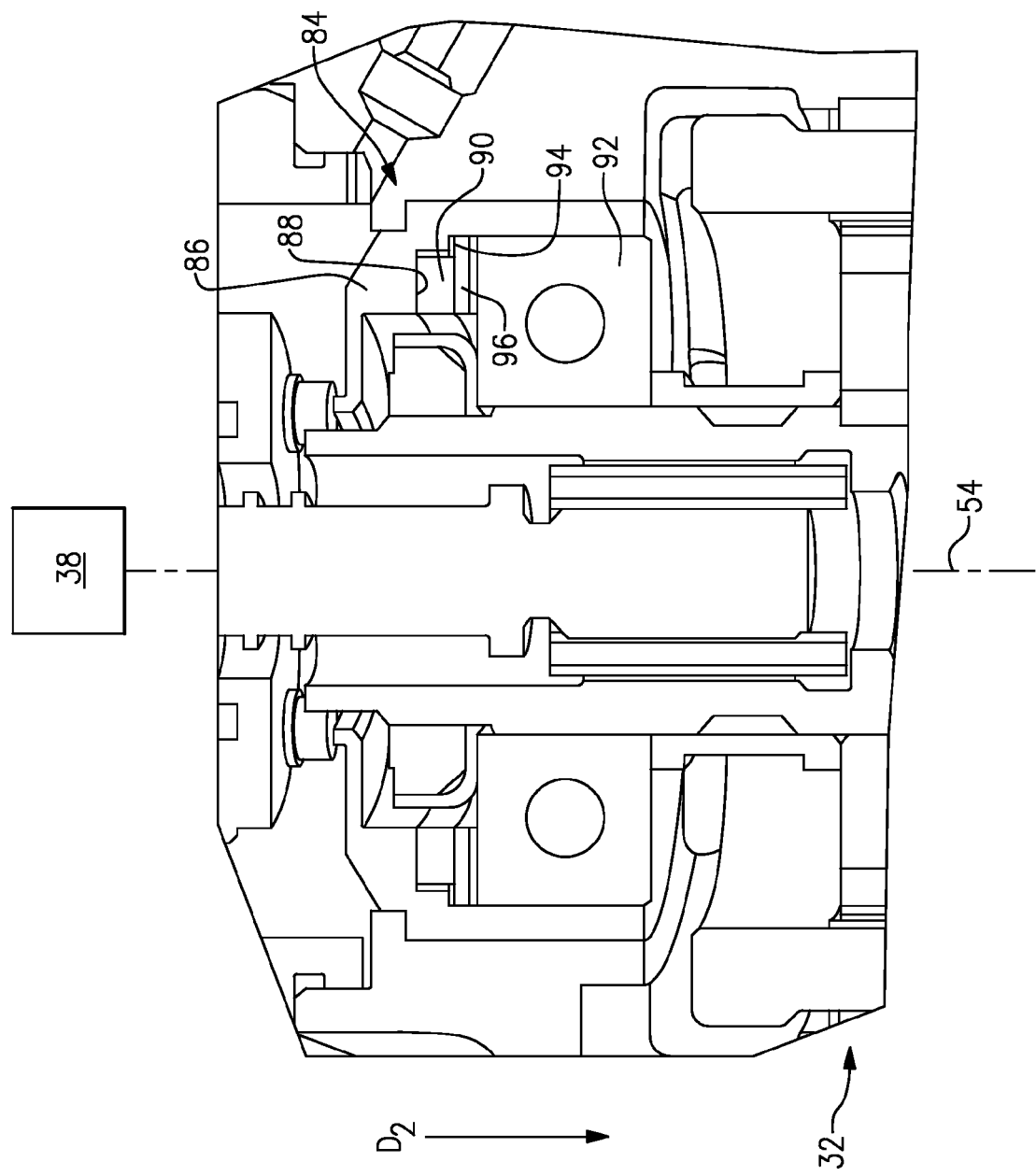
FIG. 5 shows a sectional view of generator bearing support liner within the FIG. 1 ram air turbine.

Referring to FIG. 5, another example ram air turbine bearing biasing assembly 84 includes a bearing liner 86 providing a biasing member support surface 88 that supports and holds a biasing member 90. The bearing liner 86 is another type of support member. Support members other than liners are used in other examples.

In this example, the biasing member 90 is an annular wave spring that, during typical operation, biases a generator bearing system 92 axially away from the hydraulic pump 38 in a direction $D_2$. The generator bearing system 92 is another type of component of the RAT 10. Components other than bearing systems may be biased as well. The generator bearing system 92 helps to rotatably support the rotating portions of the generator 32. The biasing member 90 preloads the generator bearing system 92 in an axial direction.

The generator bearing system 92 and the gearbox bearing system 72 (FIG. 3) are both types of components within the RAT 10. As with the bearing liner 66, the bearing liner 86 includes a step 94 that limits compression of the biasing member 90. In this example, the step 94 together with a shim 96 limit movement of the generator bearing system 92 toward the hydraulic pump 38 to limit compression of the biasing member 90 and limit HLSD and windmilling impact loads.

Features of the disclosed examples include limiting the amount of compression on biasing members within a ram air turbine. Limiting the compression may prevent damage to the biasing members and may prove beneficial for the adjacent seals. As known, seals may leak if components are shifted from normal operating positions.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A ram air turbine assembly, comprising:
    a strut movable between a deployed position and a stowed position, the strut supporting a turbine that is rotatable about a first axis;
    a drive shaft rotatable about a second axis transverse to the first axis, the drive shaft driving a hydraulic pump and a generator;
    a gearbox rotatably coupling rotation of the strut with the drive shaft;
    a gearbox bearing biasing member that biases a gearbox bearing system away from the turbine; and
    a gearbox bearing liner that supports the gearbox bearing system, the gearbox bearing liner including a step that limits movement of the gearbox bearing system toward the gearbox bearing biasing member.

2. The ram air turbine assembly of claim 1, including a generator bearing liner that supports a generator bearing system, the generator bearing liner including a step that limits movement of the generator bearing system toward a generator bearing biasing member.

3. The ram air turbine assembly of claim 2, wherein the generator bearing biasing member biases the generator bearing system toward the generator.

4. The ram air turbine assembly of claim 2, wherein the gearbox bearing biasing member and the generator bearing biasing member are both wave springs.

5. The ram air turbine assembly of claim 1, wherein the step extends axially a first distance from a gearbox bearing system support surface of the bearing liner, and the gearbox bearing biasing member extends axially a second distance when the gearbox bearing biasing member is not compressed, wherein the first distance is from 86% to 98% of the second distance.

6. The ram air turbine biasing assembly of claim 1, wherein the gearbox bearing biasing member is an annular biasing member circumferentially disposed about an axis, and the biasing member biases the component axially.

7. The ram air turbine assembly of claim 1, wherein the gearbox bearing biasing member is a wave spring.

8. The ram air turbine assembly of claim 1, including a biasing member support surface of the gearbox bearing liners, the biasing member support surface directly contacting a first side of the biasing member.

9. The ram air turbine assembly of claim 1, including a biasing member support surface of the gearbox bearing liners that extends radially toward a rotational axis of the turbine, wherein the step extends axially toward the gearbox bearing system relative to the biasing member support surface.

10. The ram air turbine assembly of claim 1, wherein the step is radially outside the gearbox bearing biasing member relative to a rotational axis of the turbine.

* * * * *

UNITED STATES PATENT AND TRADEMARK OFFICE
CERTIFICATE OF CORRECTION

| | | |
|---|---|---|
| PATENT NO. | : 9,211,958 B2 | Page 1 of 1 |
| APPLICATION NO. | : 13/430965 | |
| DATED | : December 15, 2015 | |
| INVENTOR(S) | : David Everett Russ | |

It is certified that error appears in the above-identified patent and that said Letters Patent is hereby corrected as shown below:

IN THE CLAIMS:

In claim 8, column 5, line 14; delete "liners" and replace with --liner--

In claim 9, column 5, line 18; delete "liners" and replace with --liner--

Signed and Sealed this
Tenth Day of May, 2016

Michelle K. Lee
*Director of the United States Patent and Trademark Office*